Dec. 10, 1968     A. A. BIEN ETAL     3,415,140
SLIDING JOINT MEMBER AND STRUCTURE
Filed April 3, 1967     3 Sheets-Sheet 1
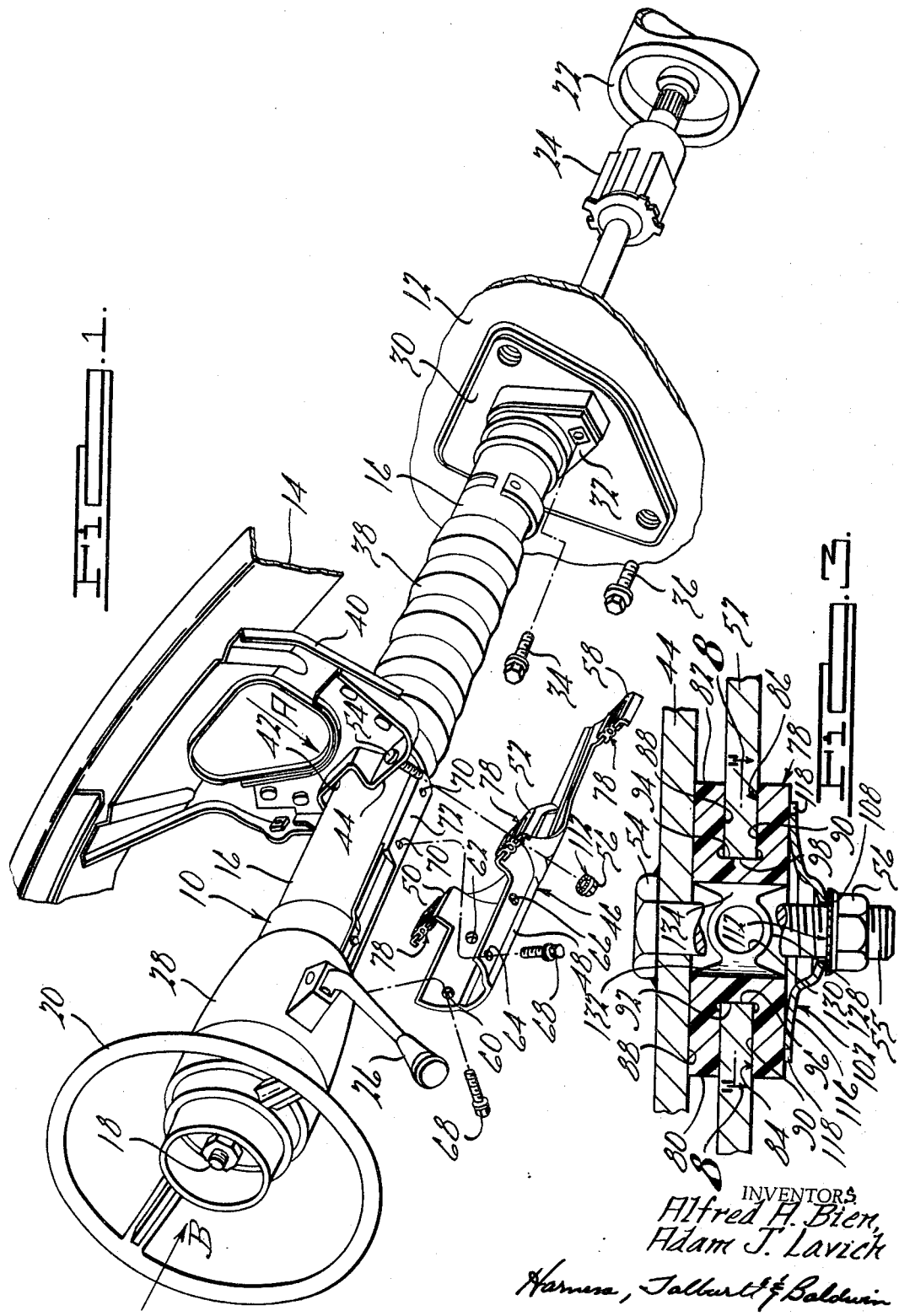
INVENTORS
Alfred A. Bien,
Adam J. Lavick
Harness, Talburt & Baldwin
ATTORNEYS

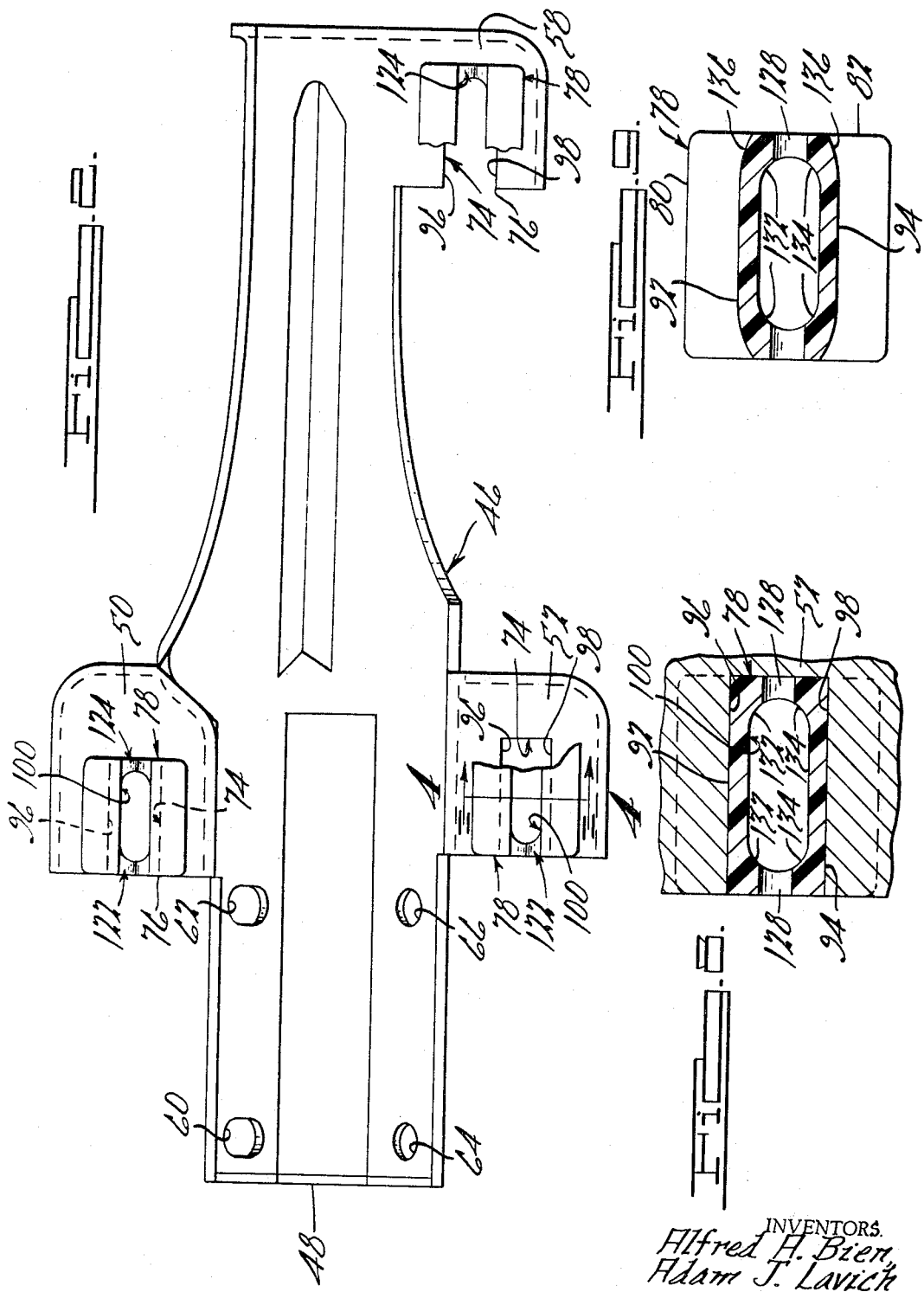

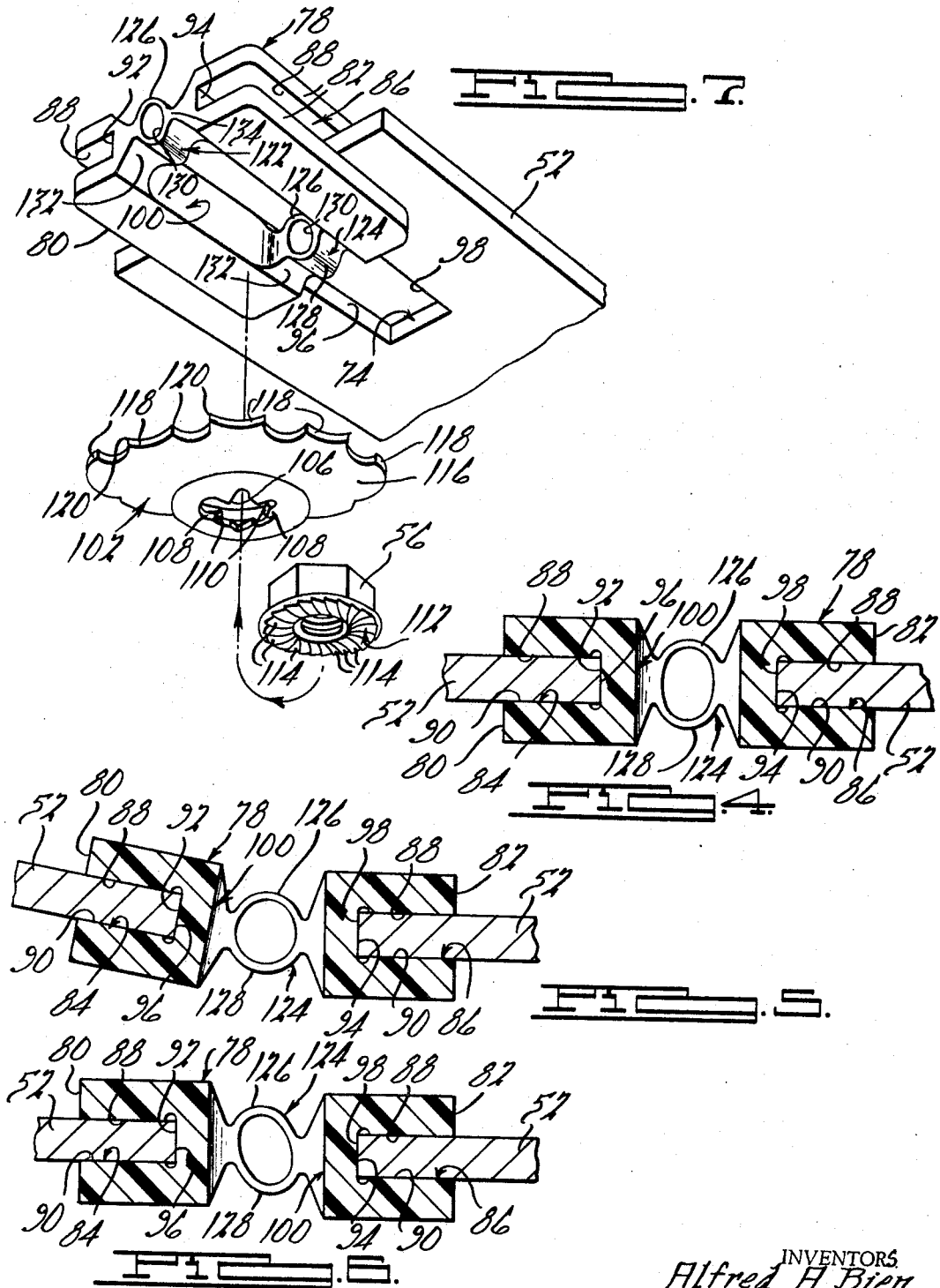

United States Patent Office 3,415,140
Patented Dec. 10, 1968

3,415,140
SLIDING JOINT MEMBER AND STRUCTURE
Alfred A. Bien, Birmingham, and Adam J. Lavich, Detroit, Mich., assignors to Chrysler Corporation, Highland Park, Mich., a corporation of Delaware
Filed Apr. 3, 1967, Ser. No. 628,146
10 Claims. (Cl. 74—492)

ABSTRACT OF THE DISCLOSURE

A friction shoe having opposed body portions which are adapted to engage flange portions of a support bracket is provided with spring means interposed between the body portions for accommodating relative movement of the body portions which may be made necessary because of physical characteristics of the associated components. A screw, carried by a support member, passes through the friction shoe and extends beyond the shoe permitting the assembly thereto of a spring washer and nut. Upon sufficient tightening of the nut the washer causes the shoe to clamp against said flange portions thereby establishing a joint or connection. Such joint or connection will slide and separate if a sufficient force is subsequently applied to the flange portions.

Background of the invention

In the past in order to provide an extra measure of safety for the operator of an automotive vehicle, steering column assemblies having been so as to undergo controlled axial collapse whenever a sufficient force is directed axially thereagainst as, for example, might occur when during an accident the operator's torso is thrown against the steering wheel.

An arrangement which has been employed in the past comprises a steering column housing which has a portion thereof formed so as to undergo such controlled axial collapse and which housing also has fixedly secured thereto a lower support bracket. The support bracket usually has a plurality of generally laterally disposed arm portions and such arm portions have open-ended slots formed therein. The open end is situated so as to be pointing generally toward the steering column steering wheel. Each of the slots, in turn, slidably receives a die cast metal member of a generally right parallelepiped configuration having slots or grooves formed in two opposing surfaces. The grooves within the die cast insert are of a size so as to freely receive therein the structure defining the slot within the bracket arm portions. Since the insert is of metal and further since it is a die cast member, the sizes of the grooves formed therein must always be somewhat larger than the thickness of the metal defining the slot within the bracket arm and also the width of the slot must always be larger than that part of the insert which is received between the opposed surfaces of the slot.

The die cast insert is secured to the arm portions, in order to be retained within the arm slots, by first drilling a plurality of holes through the insert and the metal of the arm portions and then injecting a plastic material through such drilled holes thereby forming what can be regarded as shear pins. The thickness of the shear pins is intended to determine the force necessary to shear the insert from the arm portions of the bracket thereby permitting the bracket to travel with the steering column housing as the housing undergoes controlled collapse as explained above, while permitting the die cast insert to remain, by means of a suitable fastener, secured to a structural member of the vehicle.

Many disadvantages exist with such prior art structures. For example, since both the bracket and the die cast insert are made out of metal, the manufacturing tolerances of all the dimensions must be such as to always permit the die cast insert to be relatively loose with regard to the slot formed in the support bracket. Further, since the plastic which is injected through the drilled holes has a tendency to shrink and expand in accordance with temperature and humidity, a degree of looseness will exist in accordance with ambient atmospheric conditions. Another undesirable factor is that of road shocks being transmitted into the steering column assembly and therefore into the plastic shear pins causing the shear pins to continually undergo vibrations resulting in material fatigue. All of these factors have been found to result in many of these shear pins failing in one manner or another even prior to the application of any impact force against the steering column assembly as might occur during a collision of the vehicle. Once the plastic pins fail the steering column assembly becomes loosely supported within the vehicle because of the looseness of fit between the die cast insert and the support bracket which in turn results in steering wheel and column shake and a degree of noise being generated within the vehicle.

In such instances where failure of the shear pins occurs, without the vehicle being in a collision, it becomes substantially impossible to repair the bracket and die cast insert without having to remove the entire support bracket and purchasing a replacement therefor which would include a complete set of die cast inserts along with the injected plastic shear pins.

Summary of the invention

The present invention includes a plastic friction shoe having oppositely disposed body portions between which is located spring means which may be integrally formed with the respective body portions. Each of the body portions has formed therein a groove so as to accept therein the metal surrounding a slot formed within a cooperating support bracket member. A mechanical fastener is then inserted through the plastic friction shoe and is engaged with a structural member of the vehicle whereby tightening of the fastener will cause the plastic shoe to clamp down against the metal of the support bracket thereby firmly engaging the support bracket, which is fixedly attached to the steering column housing, to the structural member of the vehicle. All of the resistance to relative movement between the plastic friction shoe member and the support bracket is achieved by virtue of the friction resulting from the plastic shoe being clamped against the support bracket.

Accordingly, an object of this invention is to provide, for a sliding joint structure, a relatively resilient friction shoe member adapted to be slidably received with a slot of a cooperating member forming the joint structure.

Another object of this invention is to provide, for a sliding joint structure, a relatively resilient friction shoe member, to be slidably received within a slot of a cooperating member forming the joint structure, having spaced body portions interconnected by spring means.

A further object of this invention is to provide, for a sliding joint structure, a relatively resilient plastic friction shoe member, to be slidably received within a slot of a cooperating member forming the joint structure, having spaced body portions interconnected by spring means permitting the body portions to undergo movement relative to each other.

Another object of this invention is to provide a clamping structure which is adapted to exert a predetermined frictional grip on a bracket connected to a steering column to permit the bracket to be slipped from the clamp when a predetermined impact force is exerted on the steering wheel.

Other objects and advantages of this invention will become apparent when reference is made to the following description considered in conjunction with the drawings.

Description of the drawings

In the accompanying drawings:

FIGURE 1 is a perspective view of a steering column assembly in the process of being secured to structural members of a vehicle through a clamping or support assembly constructed in accordance with the teachings of this invention;

FIGURE 2 is a plan view of a bracket assembly, constructed in accordance with this invention, taken generally in the direction of arrow, A, of FIGURE 1;

FIGURE 3 is a fragmentary cross-sectional view taken on a plane transverse to the axis of the steering column assembly of FIGURE 1 and passing through the axis of the fastener member which secures the support bracket to a structural member of the vehicle;

FIGURES 4, 5 and 6 are each fragmentary cross-sectional views taken generally on the plane of line 4—4 of FIGURE 2 looking in the direction of the arrows with each of FIGURES 4, 5 and 6 illustrating differing assembly problems;

FIGURE 7 is a fragmentary perspective view, partly in exploded detail, of certain of the elements comprising a joint structure according to the invention;

FIGURE 8 is a fragmentary cross-sectional view taken generally on the plane of line 8—8 of FIGURE 3 and looking in the direction of the arrows; and FIGURE 9 is a view similar to FIGURE 8 illustrating a modification of the invention.

Description of the preferred embodiments

Referring now in greater detail to the drawings, FIGURE 1 illustrates a collapsible type vehicle steering column 10 in position to be mounted to a portion of the vehicle floor panel 12 and to a structural member 14 which may be an integral part of the vehicle dash panel so as to extend generally transversely of the vehicle.

The steering column assembly is comprised of an outer housing 16 within which is mounted a steering shaft 18 having a steering wheel 20 secured thereto, at one end thereof, and extending beyond the floor panel so as to be operatively connected to a steering gear assembly 22 by a suitable coupling 24. A transmission shift or selector lever 26 is pivotally mounted in a housing portion 28 rotatable with respect to housing 16. A flange 30, connected to a flange portion 32 of housing 16 as by a bolt 34, secures housing 16 to the floor panel 12 by means of a plurality of bolts, one of which is illustrated at 36.

Housing 16 also includes an intermediate collapsible housing portion 38 which, in the form illustrated, is of a generally convoluted tubular configuration. Upon sufficient impact axially of the steering column assembly and directed against the steering wheel, the convolutions undergo deformation thereby causing the housing portion 38 to generally collapse axially and shorten the overall length of the steering column assembly.

The upper end of column assembly 10 is intended to be supported by a downwardly depending support member 40 which may in effect be an integral portion of the structural member 14. The lower-most portion of support 40 is of a yoke-like configuration providing a recessed area 42 defined between oppositely disposed flanges 44—44. Recess 42 is adapted to partly receive therein housing 16.

A bracket 46 having a main body portion 48 and oppositely disposed arm portions 50 and 52 is provided for securing the steering column assembly 16 to the support 40 by coaction of screws or bolts 54, carried by flanges 44—44 and nuts 56. As seen in both FIGURES 1 and 2, bracket 46 has a main body 48, of somewhat arcuate cross-section, and integrally formed and oppositely disposed arms or flanges 50, 52. A lowermost or end portion of bracket 46 is preferably provided with a third arm or flange 58 which is adapted to be secured to another structural part of the vehicle (not shown). Body 48 has a plurality of apertures 60, 62, 64 and 66 formed therethrough for the reception of screws or bolts 68 which, in turn, threadably engage internally threaded apertures 70—70 formed in two bosses 72—72. Bosses 72—72 are formed integrally with housing 16 and generally on opposite sides thereof so as to have the threaded apertures 70 formed therein respectively positioned in general juxtaposition to apertures 60, 62, 64 and 66 when bracket 46 is brought into engagement with the underside of steering column assembly housing 16.

Each of the arms 50, 52 and 58 is provided with a slot 74 formed so as to have an open end 76. Each of the slots 74, in turn, receives an insert 78 which, as will become more apparent from the following description, both singly and collectively serve to frictionally engage the bracket 46 to the support 40. From FIGURES 2, 3 and 7 it can be seen that insert 78 is comprised of body sections 80 and 82 which are respectively provided with slots 84 and 86. Upper and lower surfaces 88 and 90 of slots 84 and 86 terminate at their innermost ends in walls 92 and 94 which, preferably, abut against surfaces 96 and 98 of the slot 74.

The entire insert 78 is formed of a plastic which is tough resilient and has a high tensile strength, high flexural modulus, and a high fatigue endurance. It has been discovered that acetal resin, a high melting, highly crystalline, thermoplastic polymer having a chemical structure represented by the formula $(-OCH_2-)_n$ is highly suited for forming the insert 78. In this connection it has also been discovered that an acetal resin derived by polymerization of formaldehyde and sold commercially under the trademark, Delrin, is particularly suitable for use in forming an insert according to the invention. Delrin acetal resin as tested by the ASTM (American Society of Testing Materials) under standard conditions possesses the following physical properties:

| Property | ASTM No. | Value |
| --- | --- | --- |
| Tensile strength at 75° F. | D-638 | 10,000 p.s.i. |
| Flexural modulus at 73° F. | D-790 | 410,000 p.s.i. |
| Specific gravity | D-792 | 1.425. |
| Melting point (crystalline) | | 347° F. |
| Coefficient of linear thermal expansion. | D-696 | $4.5 \times 10^{-5}$. |
| Thermal conductivity | | 1.6 B.t.u./hr./ sq. ft./° F./in. |

From FIGURES 1, 3 and 7 it can be seen that the bracket 46 and steering column assembly 10 are secured to the support bracket 40 in the following manner. First, as illustrated in FIGURE 7, a plastic insert or friction member 78 is inserted in each of the slots 74 of support bracket 46. Next, the bracket 46, with friction members 78 generally in position as illustrated in FIGURE 1, may be secured to the steering column assembly housing 16 as by means of screws 68 and cooperating threaded holes 70. At this time, of course, the bracket 46 is brought into engagement with the steering column housing 16 in such a manner as to permit the passage of the shank portion 55 of screws 54 through a generally medially disposed opening 100 formed in the friction member 78. If desired, screws 54 may be rigidly secured to the support 40 as, for example, by a tack-welding operation in order to eliminate the necessity of manually holding the screw 54 during subsequent assembly thereto of the lower bracket 46.

In securing the lower bracket 46 to upper support bracket 40, the use of a relatively resilient washer 102 and cooperating lock-type nut 56 is preferred.

With reference to FIGURE 7 it can be seen that washer 102 has a central opening 106 which permits the passage therethrough of shank 55 of screw 54. However, the opening 106 is defined by a plurality of tabs 108 which are generally radially inwardly directed and also have their respective free ends 110 twisted thereby combining to provide a plurality of detent-like fingers. It will also be noted that the axial thrust surface 112 of nut 56 is formed to provide a plurality of discrete inclined surfaces 114, which also extend in a generally radial direction. Accordingly, when washer 102 and nut 56 are assembled as shown in FIGURE 3 the detents or tabs 108 of washer 102 engage the rachet-like surface 112 of nut 56 in order to prevent nut 56 from becoming accidentally loosened.

As best illustrated in FIGURE 7, washer 102 is also provided with flange 116 which has a periphery defined by a plurality of finger-like abutments 118, each of which is directed generally radially outwardly. Further, each of the abutments 118 is formed so as to provide relatively sharp corners, as at 120, which first engage the friction member 78 whenever the washer is brought into engagement with the member 78. As a consequence of such provisions being made, additional advantages are obtained.

For example, with reference to FIGURES 3 and 7, it can be seen that when the washer 102 and nut 56 are first assembled onto shank 55 of screw 54, that the corners of barbs 120 of washer 102 will first engage the plastic material of friction member 78 as nut 56 is moved in the tightening direction. Once nut 56, washer 102 and insert 78 are all brought into series engagement with each other, further tightening of nut 56 will first cause the barbs 120 to bite into the plastic material of insert 78 and then cause resilient deformation of washer 102. Such deformation of the washer 102, at the flange end thereof, is accomplished primarily because of the tendency of the finger-like abutments 118 to because flattened against the friction member 78. However, since the abutments 118 are secured to the flange 116 such tendency to have them become flattened can be accomplished only by having the free ends thereof move in a direction generally radially away from the center of the washer 102. Therefore, as abutments 118 tend to become flattened, the barbs 120, which have already been made to bite into the surface of plastic insert 78, cause body portions 80 and 82 of friction member 78 to at least tend to move away from each other thereby assuring end surfaces 92 and 94 to be in abutting engagement with surfaces 96 and 98 of bracket slot 74.

The reason that body portions 80 and 82 are able to move relative to each other is the provision of suitable spring means intermediate the body portions 80 and 82.

In the preferred form of the invention, such spring means takes the form of spring sections 122 and 124, spaced from each other and integrally formed with the body portions 80 and 82. Each of the spring sections 122 and 124 have oppositely disposed spring portions 126 and 128 which as viewed, for example, in FIGURE 3 present a generally circular configuration with an aperture 130 defined by the arcuate segments 126, 128 and the laterally disposed junctures 132 and 134 which are integrally formed with the body portions 80 and 82, respectively.

Because of manufacturing tolerances it is not always certain that flange 44 will be flat or exactly parallel to flange 52, when assembled as shown in FIGURE 3, nor is it certain that the size of the slots 74 will be consistent. Further, flange 52 may become bowed as depicted in FIGURE 5 or it may become somewhat distorted causing the side surfaces 96 and 98 of slot 74 to be offset or even skewed to each other as shown by FIGURE 6. However, all of such conditions which were major problems in the prior art arrangements are easily accommodated and overcome by the present invention.

For example, referring to FIGURE 4, if it is assumed that the width of slot 74, as defined by surfaces 96 and 98, is less than the distance from surfaces 92 and 94 of insert 78, the friction member insert 78 is easily altered to accommodate the situation by moving body portions 80 and 82 toward each other and thereby compressing spring sections 126 and 128 into a somewhat oval configuration as shown in FIGURE 4. Such compression of spring portions 122 and 124 permits the friction member to be inserted into the otherwise narrow slot 74.

Similarly, if the slot 74 should be formed in a bowed portion of flange 52 as shown in FIGURE 5 or if surfaces of slot 74 should either become offset or skewed to each other as illustrated by FIGURE 6, spring sections 126 and 128 undergo resilient deformation to enable the insertion of member 78 into the existing slot 74.

Further, even if the slot 74 is slightly oversize insert 78 will be made to conform to the width of the slot by virtue of the separating action which body portions 80 and 82 experience when the washer abutments 118 are flattened against the insert 78 during assembly thereof, as previously described.

The various conditions described with reference to FIGURES 4, 5 and 6 were made on the assumption that variations in the flange 52 were created during manufacturing of the lower bracket 46. However, it should be made clear that such conditions, or combinations thereof, can also arise because of variations existing in both the upper bracket 40 and its flange 44. That is, as nut 56 is tightened during assembly, variations existing in, for example, flange 44 may cause the insert 78 and adjacent portions of flange 52 to undergo some distortions in attempting to conform to the variations presented by flange 44. It should also be evident that such variations present no problems to the friction member or friction shoe 78 of this invention because of the provision of intermediate spring portions 126 and 128.

FIGURE 9 illustrates another modification of the invention wherein the opposite ends of surfaces 92 and 94 of insert 78 are provided with tapered portions 136 so as to further facilitate insertion of the shoe 78 into slot 74.

Referring to FIGURES 1 and 3, it can be seen that when nut 56 is tightened to predetermined torque requirements that surfaces 88 and 90 of each of the slots 84 and 86 are clamped against the flange 52 with a predetermined force. The clamping force is determined on the basis of a desired frictional force between the friction shoe 78 and its cooperating flange such as, for example, flange 52. Accordingly, after each of the friction shoe members 78 and support bracket 46 are assembled as shown in FIGURES 1 and 3, a force, in excess of a predetermined minimum force, applied generally in the direction of arrow B against the steering wheel 20 and the housing 16 will exceed the frictional force developed by the friction shoe 78 thereby causing movement of the support bracket 46 relative to the friction shoes 78. During this time the upper portion of steering column assembly housing 16 and bracket 46 fixedly secured thereto move generally in the direction of arrow B causing the convoluted portion 38 of housing 16 to collapse axially. The open end 76 of slots 74 in the support bracket 46 permit each of the inserts or friction shoes 78 to slide out of the slots 74 and be retained by the screws 54.

Even though the invention has been described with reference to a screw 54 secured to flange 44 of bracket 40, it should be apparent that the invention can be practiced using a screw which passes through washer 102 and insert 78 and threadably engages a nut portion carried by the flange 44.

The invention as herein disclosed provides a friction shoe member 78 and a sliding joint structure which, if not completely then at least for the most part, eliminates looseness and attendant rattles often prevalent with prior art structures and further provides a friction insert which because of its unique configuration enables it to conform to many different physical conditions which other cooperating components may present.

Even though only a preferred embodiment and one

We claim:

1. A resiliently deformable shoe member for forming a joint structure wherein first and second members are frictionally retained in a manner permitting said first and second members to experience relative movement upon application of a sufficient force to one of said members, comprising first and second body portions spaced from each other, a first slot formed in said first body portion, a second slot formed in said second body portion, said first and second slots being adapted to receive therein a portion of said first member, spring means disposed between and interconnecting said first and second body portions so as to permit said first and second body portions and said first and second slots to assume positions which accommodate generally the configuration of said portion of said first member, and an aperture formed through said shoe member generally intermediate said first and second body portions for permitting the passage therethrough of cooperating fastening means for securing said shoe member and said first member to said second member, said first and second body portions being deformable to the extent enabling the surfaces of said slots to firmly engage cooperating surfaces of said portion of said first member whenever a clamping force is directed generally transversely against said first and second body portions thereby creating a frictional engaging force between said shoe member and said first member, said shoe member being effective for maintaining said first member in a clamped position until a separating force in excess of said frictional engaging force is applied to said first member at which time said first member and said second member will move relative to each other while said shoe member will be effectively retained to said second member by means of said cooperating fastening means.

2. A resiliently deformable shoe member according to claim 1 wherein said shoe member is formed of an acetal resin.

3. A resiliently deformable shoe member according to claim 1 wherein said spring means comprises first and second spring sections spaced from each other and interconnecting said first and second body portions.

4. A resiliently deformable shoe member according to claim 1 wherein said spring means comprises a plastic spring section formed integrally with said first and second body portions.

5. A resiliently deformable shoe member according to claim 1 wherein said spring means comprises plastic spring sections spaced from each other and formed integrally with said first and second body portions, each of said spring sections having upper and lower spring portions integrally joined to each other and to said first and second body portions.

6. A resiliently deformable shoe member according to claim 5 wherein said upper and lower spring portions are of arcuate configuration and define a generally circular aperture therebetween.

7. A sliding joint structure, comprising a first structural member, a second structural member, a slot formed in said first structural member and having an open end, a plastic friction insert having first and second body portions spaced from each other, a first groove formed in said first body portion, a second groove formed in said second body portion, said first and second grooves receiving such portions of said first structural member which generally define said slot, a first plastic spring section formed integrally with and intermediate of said first and second body portions, a second plastic spring section formed integrally with and intermediate of said first and second body portions, fastener means engaged with said second structural member and passing through said plastic friction insert so as to be generally between said first and second body portions, said fastener means functioning to retain one side of said first body portion and one side of said second body portion against said second structural member, a resiliently deflectable washer retained by said fastener means in a manner causing edge portions of said washer to engage another side of said first body portion opposite to said one side and to engage another side of said second body portion opposite to said one side of said second body portion, said washer being effective upon said fastener means being tightened to urge said first and second body portions away from each other thereby causing end surfaces of said first and second grooves to engage edge surfaces of said slot in said first structural member, said washer being further effective upon said fastener means being tightened to cause said first and second body portions to undergo sufficient deflection in order to develop a compressive clamping force by the surfaces of said first and second grooves against the surfaces of said surrounding portions of said first structural member, and relatively resilient detent means carried by said washer and said fastener means for preventing accidental loosening of said fastener means after said fastener means is tightened a predetermined amount.

8. A sliding joint structure according to claim 7 wherein said washer is of a generally frusto-conical configuration having barb-like fingers carried at the wider end engaging said first and second body portions, and wherein said detent means comprise spring like fingers on the smaller end of said frusto-conical configuration engaging a ratchet-like cam surface on said fastener means.

9. A sliding joint structure according to claim 7 wherein said fastener means comprises a screw passing through said second structural member so as to have its threaded shank portion extending beyond the said other sides of said first and second body portions, and a cooperating nut having an axial end surface formed with generally radially extending cam-like surfaces.

10. A sliding joint structure for a vehicular steering column assembly which is adapted to undergo axial collapse when a sufficient impact force is directed against the steering wheel of said steering column assembly, comprising an upper fixed support, first and second flanges carried by said fixed support, a steering column assembly housing located generally between said first and second flanges, a lower support bracket fixedly secured to said steering column assembly housing, first and second generally laterally extending arms carried by said bracket, a first slot formed in said first arm and having an open end pointing generally toward the steering-wheel-end of said housing, a second slot formed in said second arm and having an open end pointing generally toward the steering-wheel-end of said housing, a pair of plastic friction shoes each having first and second body portions spaced from each other, a first groove having top, bottom and side surfaces formed in each of said first body portions, a second groove having top, bottom and side surfaces formed in each of said second body portions, spring means intermediate of and interconnecting said first and second body portions in each of said friction shoes, said friction shoes being respectively received within said first and second slots in a manner causing said grooves to each receive that portion of the respective arms surrounding and defining said first and second slots, and a pair of fasteners respectively engaging said first and second flanges of said upper fixed support, each of said fasteners extending through respective ones of said plastic friction shoes so as to be generally between said spaced first and second body portions, said fasteners each being effective upon being tightened to cause said top and bottom surfaces of each groove to apply a clamping force on those portions of said arms within said grooves, each of said fasteners also being effective upon being tightened to cause said first and second flanges to engage one side of said first body portion and one side of said second body portion, said top and bottom surfaces being effective to slide relative to said bracket arms and pass out of said slots whenever an impact force is directed against the steering wheel which is greater than the frictional force between said grooves and arm portions contained therein developed by said clamping force applied by means of said fasteners.

No references cited.

MILTON KAUFMAN, *Primary Examiner.*

U.S. Cl. X.R.

180—82; 280—87; 248—221, 230